UNITED STATES PATENT OFFICE 2,461,990

POLYMERS AND COPOLYMERS OF PROPIOLATES

Joy G. Lichty, Stow, Ohio, assignor to Wingfoot Corporation, Akron, Ohio, a corporation of Delaware No Drawing. Application June 7, 1947, Serial No. 753,381

3 Claims. (Cl. 260—84.5)

This invention relates to polymers resulting from the polymerization of a propiolate monomer having the formula $CH\vdots CCOOCH_2CH_2R$ in which in which R is halogen or cyano. The invention also includes copolymers of such propiolates with another polymerizable monomer.

The propiolates used in producing the polymers and copolymers of this invention are made by the pyrolysis of the alpha haloacrylates and the dihalopropionates. The acrylates and propionates which may be so treated may be represented by the following formulae:

$CH_2:CRCOOCH_2CH_2X$;
$CH(Cl):CHCOOCH_2CH_2X$;
$CH_3CR_2COOCH_2CH_2X$;
$CH_2RCH(R)COOCH_2CH_2X$;
$CH(R)_2CH_2COOCH_2CH_2X$ where R is chlorine or bromine, X is chlorine, bromine, iodine, fluorine, or cyano.

In the pyrolysis of the alpha chlor acrylate, a single hydrogen chloride molecule is removed. In the pyrolysis of the dichlor propionates, it is necessary to remove two mols of hydrogen chloride to produce a propiolate. The dehydrochlorination in either case is effected at a high temperature, 300-550° C., and preferably under a vacuum. Ordinary pyrolytic apparatus may be employed. The dichloro propionates which can be thus converted to propiolates include beta cyanoethyl alpha, beta-dichloropropionate, beta-chloroethyl alpha, beta-dichloropropionate, beta-bromoethyl alpha, beta-dichloropropionate, cyanoethyl alpha - bromo - beta-chloropropionate, beta-chloroethyl alpha, beta-dibromopropionate. The alpha halo acrylates which can be converted by this method of pyrolysis to produce propiolates include beta - cyanoethyl - alpha-chloroacrylate, beta - chloroethyl-alpha-chloroacrylate, beta-dichloroethyl-alpha-chloroacrylate and beta-methoxyethyl alpha-chloroacrylate.

The pyrolysis may be illustrated by referring to the conversion of a mixture of beta-chloroethyl alpha, beta dichloropropionate and beta-chloroethyl monochloroacrylate to beta-chloroethylpropiolate. These two reactions are illustrated by the following formulae:

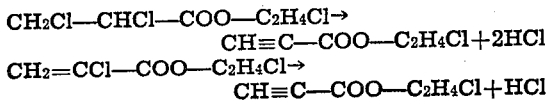

The pyrolysis of the dichloropropionate may follow either of the following courses:

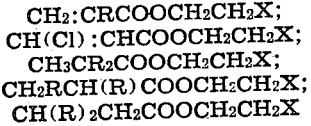

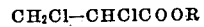

Course A is to be expected rather than Course B, although probably both some alpha chlor and some beta chlor will be formed during the pyrolysis to in turn be dehydrochlorinated.

The following example shows the production of beta chloro ethyl propiolate:

Example 1

A mixture containing 79% chloroethyl-monochloroacrylate and 21% chloroethyl dichloropropionate was pyrolyzed in a vertical glass tube ⅞" in diameter packed with Berl saddles. The mixture was added dropwise at the rate of ½ gram per minute into this tube while the iron core holding and heating the glass tube was heated to a temperature of 480° C. The tube was evacuated to a pressure of 200 mm. The gases and vapors given off were passed through a system of condensers. The condensate obtained was distilled to produce a high yield of beta chloro ethyl propiolate. The purified propiolate boiled at 65-7° C. under a pressure of 26 mm.

The following example shows the production of cyanoethyl propiolate:

Example 2

One hundred sixty one and five-tenths grams of dichloropropionyl chloride was added gradually to 107 grams ethylene cyanohydrin with stirring. A small amount of solid separated which was filtered off. The excess of cyanohydrin was distilled from the filtrate at 5 mm. pressure, leaving the cyanoethyl ester of dichloropropionic acid. On heating this HCl was split out. The material was distilled yielding a fraction boiling at 114-126° C. at 20 mm. which was high in cyanoethyl propiolate.

Generally speaking, propiolates do not readily polymerize or copolymerize. However, a propiolate of the types here referred to may be polymerized by mass polymerization or by emulsion polymerization. For example, beta-chloroethyl propiolate—CH:C.COO.CH$_2$CH$_2$Cl—will polymerize if merely allowed to stand. It gives a transparent polymer, which may be used for molding and in the manner that other resinous plastics are employed.

The propiolates of the type here referred to may be copolymerized with 1,3-butadiene and the open chain conjugated diene hydrocarbons of this class, having 4 to 6 carbon atoms, such as isoprene, 2,3-dimethyl butadiene, cis- and trans-piperylene or mixtures of any of these. The copolymerization may be carried out as a mass reaction or in the form of an emulsion. The propiolates may be copolymerized with another monomer in any proportions as, for example, by using but 5 per cent of the propiolate to 95 per cent of the propiolate and 5 per cent of the other monomer. A copolymer containing 50 per cent of each monomer or 25 per cent of one and 75 per cent of the other may be formed. These copolymers are resinous products suitable for molding or for other uses in which resins are ordinarily employed.

The following examples illustrate the production of copolymers by the emulsion process. The butadiene may be reacted with the propiolate alone, or the propiolate may be mixed with another monomer. In the examples a mixture of 85 per cent of beta-cyanoethyl propiolate and 15 per cent of beta-cyanoethyl-alpha-chloroacrylate was employed. Various emulsifying agents and catalysts, etc., may be used in carrying out the emulsion copolymerization. The following formula is typical of those which may be employed:

|  | Parts by weight |
|---|---|
| Water | 20 |
| NaBO$_3$.4H$_2$O | 0.133 |
| CCl$_4$ | 0.48 |
| 5% NaCN solution | 0.5 |
| 10% acetaldehyde solution | 0.5 |

The solutions referred to in the above formula are aqueous solutions. Buffers were added to give a pH of about 6.7. Using such an emulsification medium, six parts by weight of butadiene and six parts by weight of the propiolate-acrylate mixture were copolymerized at 38° C. for forty hours and gave a high yield of copolymer. In another example 7.14 parts of butadiene and 2.38 parts of the propiolate-acrylate mixture were copolymerized for the same time at the same temperature. A good yield of copolymer was produced.

This application is a continuation-in-part of my application Serial No. 468,543, filed December 10, 1942, and now abandoned, for polymers and copolymers of propiolates.

I claim.

1. A polymer resulting resulting from the polymerization of beta-cyanoethyl-propiolate.

2. A copolymer resulting from the polymerization of a mixture containing 5 to 95% of beta-cyanoethyl-propiolate and 95 to 5% of butadiene-1,3.

3. The copolymer of a mixture of 85% of beta-cyanoethyl propiolate and 15% of beta-cyanoethyl alpha-chloroacrylate and butadiene-1,3, the mixture of propiolate and acrylate being present in an amount of at least 5% and not more than 95% of the total monomers.

JOY G. LICHTY.

REFERENCES CITED

The following references are of record in the file of this patent:

UNITED STATES PATENTS

| Number | Name | Date |
|---|---|---|
| 2,249,535 | McCallum | July 15, 1941 |
| 2,273,891 | Pollack | Feb. 24, 1942 |
| 2,318,959 | Muskat | May 11, 1943 |

FOREIGN PATENTS

| Number | Country | Date |
|---|---|---|
| 119,544 | Australia | Dec. 5, 1946 |
| 462,117 | Belgium | Jan. 1, 1946 |